Figure 1:
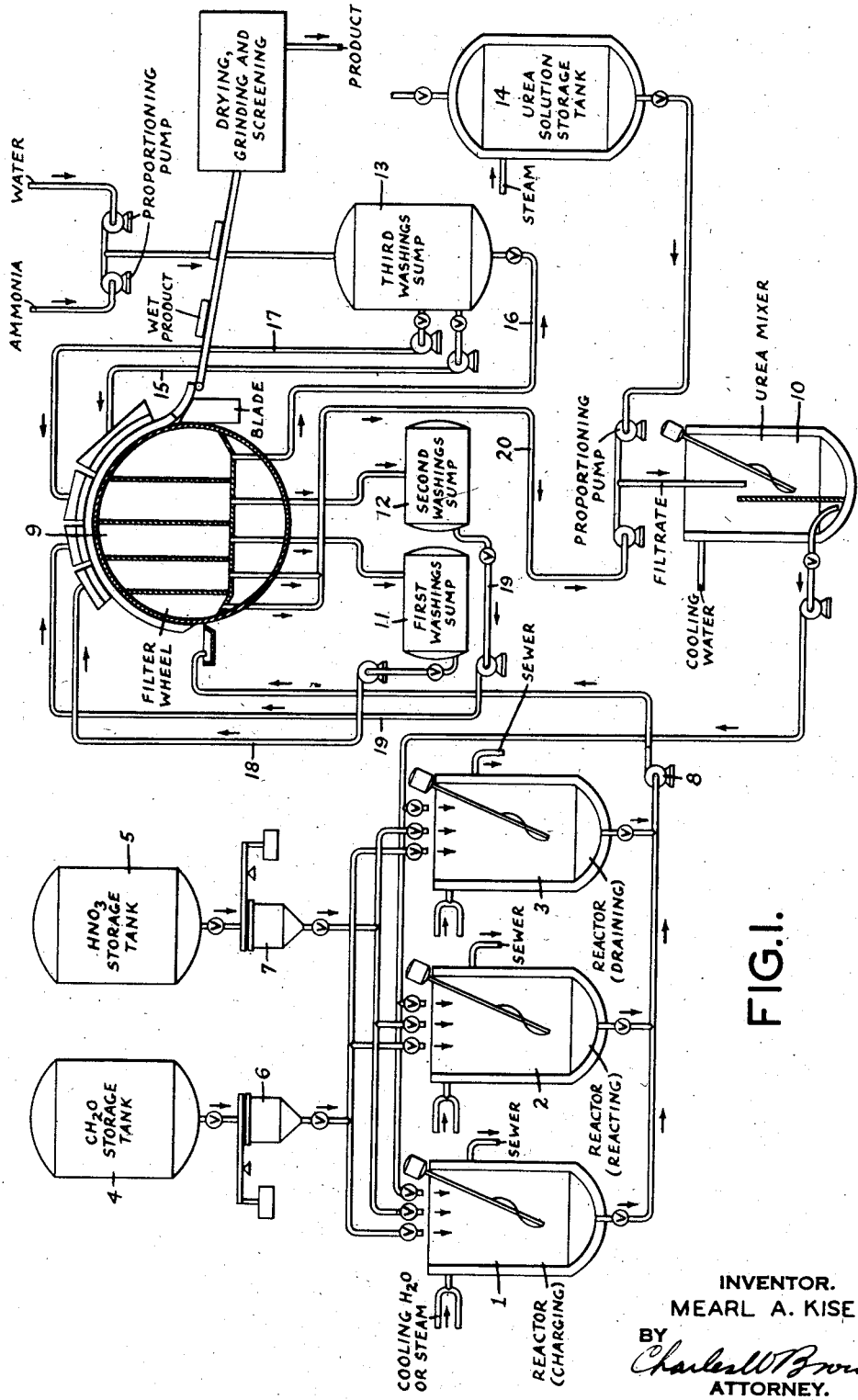

Patented July 7, 1953

2,644,806

UNITED STATES PATENT OFFICE 2,644,806

PROCESS FOR PREPARING A FERTILIZER CONTAINING WATER-INSOLUBLE NITROGEN

Mearl A. Kise, Portsmouth, Va., assignor to Allied Chemical & Dye Corporation, New York, N. Y., a corporation of New York Application September 14, 1950, Serial No. 184,894

10 Claims. (Cl. 260—69)

This invention relates to a process for the production of a solid reaction product of urea and formaldehyde containing water-insoluble nitrogen having a high activity, as determined by insoluble nitrogen and the neutral potassium permanganate tests of "Official and Tentative Methods of Analyses" of the A. O. A. C., pages 29 and 30 (Sixth Edition, 1945). The product is thus suitable for use as a fertilizer. The invention further relates to a new and improved cyclic process for the production of such solid products from urea and dilute aqueous solutions of formaldehyde, such as the commercial solutions containing 35% to 50% by weight formaldehyde or the commonly known formalin solutions containing about 37 weight percent formaldehyde, by which the dilute solutions containing dissolved urea and formaldehyde which are obtained in making the solid urea-formaldehyde products may be utilized in a cyclic process without having to withdraw from the process accumulated liquors from which the dissolved urea and formaldehyde must be recovered if the process is to be economical. The term "dissolved" urea and formaldehyde used herein refers to these materials which are present in solution in the liquors as unreacted urea and unreacted formaldehyde and to those materials present in the liquors as reaction products of urea and formaldehyde which are soluble therein.

Numerous processes have heretofore been proposed for reacting urea and formaldehyde to form water-insoluble products, particularly resinous products. As pointed out in U. S. P. 2,415,705, which issued February 11, 1947 to Leonard V. Rohner and Alvin P. Wood, certain urea-formaldehyde reaction products are desirable fertilizers in that they contain water-insoluble nitrogen which in the soil becomes slowly available as plant food. Thus, a single application of such a fertilizer serves as a source of food for plant growth over a long period of time as compared with the water-soluble fertilizer salts such as sodium or ammonium nitrate. However, it was there further pointed out that for a fertilizer containing water-insoluble nitrogen to be acceptable to the trade its nitrogen content must pass a nitrogen activity test as set forth in the A. O. A. C. "Methods of Analyses."

Under many conditions urea and formaldehyde react to form water-soluble products and under most of the known conditions whereby they may be reacted to form water-insoluble products, those products are resinous and the activity of the water-insoluble nitrogen is low. The production of solid urea-formaldehyde reaction products in which a high percentage of the nitrogen is insoluble and this insoluble nitrogen has a high degree of activity requires, therefore, careful maintenance of particular conditions such as those described in the above United States patent.

Heretofore, however, the known conditions for producing from urea and formaldehyde fertilizers containing water-insoluble nitrogen of high activity, particularly when employing dilute aqueous solutions of formaldehyde as one of the starting materials, have entailed long reaction periods for formation of the precipitated solid from the reaction mixtures and the evaporation of water from the reaction mixture at elevated temperatures, or accumulation of dilute solutions containing dissolved urea and formaldehyde which it is difficult and costly to treat for recovery of the dissolved materials for reuse in the production of the fertilizer. This evaporation of water or accumulation of dilute solutions of valuable materials is aggravated by the need for washing the precipitated solid to remove mother liquor, in which operation the wash liquors formed contain substantial amounts of materials. If not recovered from the very dilute solutions, the materials represent a substantial economic loss.

Further, known water-insoluble urea-formaldehyde reaction products as initially prepared having a high N-activity, after contact with acidic materials for a period of time show a substantial decrease in the activity of their insoluble nitrogen or degradation in their N-activity. I have discovered conditions for reacting urea and formaldehyde in aqueous solutions whereby an insoluble reaction product is obtained which shows relatively small degradation in N-activity in contact with acidic materials as compared with other urea-formaldehyde products of similar high N-activity. Processes disclosed and claimed herein include such conditions for making products stable with respect to degradation in N-activity, and I more particularly claim processes, characterized by such conditions, for producing those products.

I have not only discovered certain conditions which are particularly effective for reacting urea and formaldehyde in dilute aqueous solution to form a solid reaction product containing water-insoluble nitrogen of high activity. I have further discovered a process in which those conditions for the reaction may be employed and the mother liquors separated from the precipitated solid are utilized in making up the reaction mixture from which the solid product is precipitated. Further, even the wash liquors obtained in washing the solid with the necessary quantity of water may be incorporated in the reaction mixture and its content of dissolved material utilized. As further important contributions to the production of fertilizers from urea and formaldehyde, I have discovered that by employing my particular conditions for reacting urea and formaldehyde only a short reaction time is required for precipitation of the solid from a dilute aqueous reaction mixture and the resulting solid is resistant to degradation of its insoluble nitrogen when in contact with acid soils or mixed with other fertilizer ingredients which render the mixture acidic.

In carrying out my process, urea and formaldehyde are reacted in aqueous solution under the following conditions:

1. The initial acidity of the aqueous reaction mixture is pH 0.9 to 1.7, preferably pH 1.3 to 1.7.

2. The temperature of the reaction mixture during the reaction period is 25° C. to 45° C., preferably 25° C. to 35° C. The reaction of urea and formaldehyde is exothermic and sufficient heat is evolved so that when the reaction mixture is made up from materials at room temperature, the temperature of the reaction mixture spontaneously rises to 25° to 35° C. Generally, provision must be made for cooling the reaction mixture in order to maintain it at temperatures within that range.

3. The mol ratio of urea to formaldehyde in the reaction mixture is 2.5 to 4 mols urea to 1 mol formaldehyde, preferably 2.5 to 3 mols urea to 1 mol formaldehyde.

4. The concentration of total urea and formaldehyde (including their reaction products calculated in terms of equivalent amounts of urea and formaldehyde) in the reaction mixture is 30% to about 15% by weight, preferably about 15% to about 20%.

5. The reaction period is about ½ to about 1½ hours. Most of the water-insoluble reaction product of the urea-formaldehyde which forms under my reaction conditions precipitates from the aqueous reaction mixture by the end of a 20-30 minute period from the time the reaction mixture is prepared and is at reaction temperatures. Generally, there is only a slow precipitation of additional insoluble reaction product following the first one-half hour period. On the other hand, at the lower temperatures and acidities of reaction mixture of the preferred conditions described above, contact of the precipitate with the mother liquor from which it has precipitated for an additional period of one hour beyond the one-half hour reaction period, does not cause any serious change in quality of the precipitate. When, however, reaction temperatures above 35° C. are employed, to insure the product having the desired high N-activity of at least 80%, the maximum reaction time becomes progressively shorter from 1½ hours to about ½ hour, the mol ratio of urea to formaldehyde becomes progressively greater from 3 to 4, and the pH becomes progressively greater from 0.9 to at least 1.3, as higher reaction temperatures above 35° C. are employed up to a temperature of 45° C.

By reacting urea and formaldehyde under the foregoing conditions at the end of a reaction time of about one-half hour, most of the formaldehyde has reacted with the urea to form a water-insoluble compound which precipitates from the solution. At the lower acidities in the range pH 1.3 to 1.7 and lower temperatures in the range 25° to 35° C., a longer contact of the precipitated material with the acidic solution or mother liquor up to about one hour causes little change in the activity of the insoluble nitrogen of the product. Accordingly, at these acidities a total reaction period of about ½ to about 1½ hours before the precipitate is separated from the mother liquor is permissible. At the higher acidities of pH 0.9 to 1.3 and higher temperatures of 35° to 45° C., however, the precipitate formed within a reaction period of one-half hour on prolonged standing in contact with the solution shows a substantial decrease in its nitrogen activity. This is prevented by employing the higher ratios of 3 to 4 mols urea per mol of formaldehyde and quickly separating the precipitated solid from the mother liquor at the end of a half hour reaction period.

The solid reaction product prepared under the foregoing conditions is separated from the mother liquor. The latter, with addition of urea and dilute aqueous formaldehyde solution of about 35 to 65 weight percent strength to bring its urea-formaldehyde ratio and concentration of reactants within the ranges specified above, is again subjected to the above defined reaction conditions for precipitation of additional solid product.

In developing such a recycle process, it was found that the continued slow precipitation of solid from the mother liquor after separation of the mother liquor from solid product, tended to cause clogging of pipes and deposit of solid in other portions of the apparatus employed in handling these mother liquors. This presents some difficulty in operating the recycle process. I discovered that by adding the make-up urea to the mother liquor immediately following separation therefrom of the solid product, the further slow deposition of solid was inhibited, obviating these difficulties in handling the mother liquor. While this immediate addition of the make-up urea to the mother liquor is not essential to a recycle process, it does contribute greatly to its ease and economy of operation. Further, this discovery that slow precipitation of solid from a mother liquor separated from solid product formed by reaction of urea and formaldehyde, which mother liquor contains urea and formaldehyde in solution, may be inhibited by addition of urea to the mother liquor, has application in processes other than my particular recycle process. It may advantageously be employed in any operation in which such a mother liquor is to be conveyed through pipes or held in equipment where deposition of solid is undesired. The addition to such a mother liquor of urea in amount sufficient to bring the mol ratio to at least 6 mols urea for every one mol formaldehyde is effective to inhibit precipitation of solid urea-formaldehyde reaction product at ordinary plant operating temperatures at which such liquors are conveyed or stored.

In addition to recycling the mother liquor for incorporation into the reaction mixture, the preferred cyclic process of my invention includes washing the separated solid product with limited amounts of wash water and introducing all or substantially all of the wash liquors resulting from this washing operation into the reaction mixture from which additional solid product is to be obtained. I have further developed a particular procedure for washing the solid separated from mother liquor with wash solutions containing water supplied thereto in amount less than that retained by the washed solid, which permits recycling all of the resulting wash liquors and maintaining suitable concentrations and mol ratios of urea to formaldehyde in the reaction mixture, while supplying the formaldehyde as a dilute aqueous solution of about 37 weight percent formaldehyde. This particular washing procedure is more completely described in connection with the following Example 1 of a recycle process embodying my invention.

This preferred recycle procedure of my invention permits of obtaining high yields of good quality product without undergoing the expense of evaporating water from the dilute solutions formed in reacting urea and formaldehyde in aqueous solutions or in washing the solid reaction product.

Figure 2:
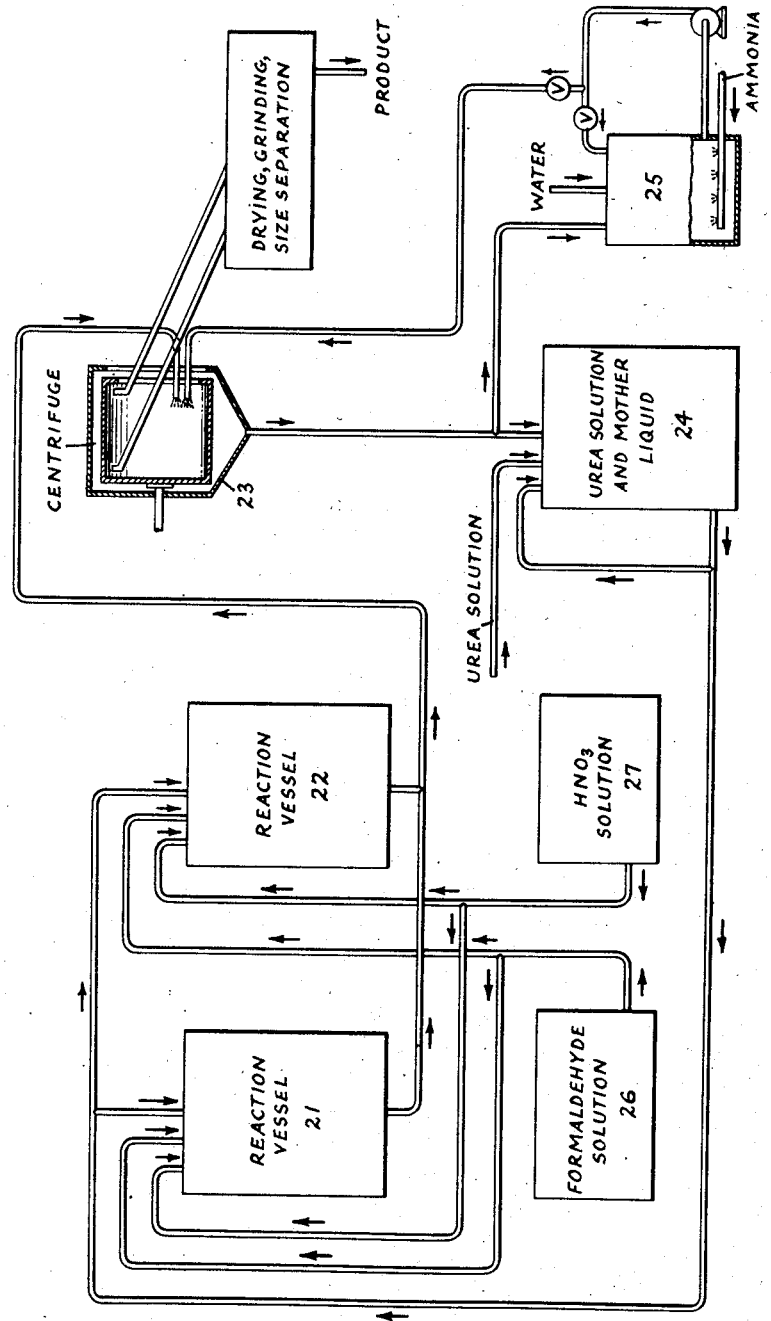

Fig. 1 of the accompanying drawings schematically illustrates the embodiment of my invention described in the following Example 1 and an apparatus suitable for carrying out that example. Fig. 2 similarly illustrates a modified process, described in detail in Example 2.

*Example 1.*—With reference to Fig. 1 of the drawings the numerals 1, 2 and 3 designate three reaction vessels provided with jackets through which a heating or cooling fluid may be passed to control the temperature of materials in these vessels. A storage tank 4 for formaldehyde solution and another storage tank 5 for nitric acid is each connected for passage of the solution through a measuring device 6 and 7, respectively, and thence through the indicated piping to each of reaction vessels 1, 2 or 3. A pump 8 and pipes leading to the pump from each of the reaction vessels and from the pump to a filter wheel 9 serves to convey the contents of each of the reactors to the filter wheel. This filter wheel may be any of the conventional types suitable for separating a finely divided solid from a liquid, and washing the filter cake four times while on the filter wheel. A mixing vessel 10 is arranged for directly draining or pumping thereto mother liquor and first wash liquor sucked from the solid product by the filter wheel. Sumps 11, 12 and 13 are connected with the filter wheel for supplying thereto from sump 13 water containing ammonia for the final two washings of the filter cake; from sump 12 wash liquor from the next to the last washing step which is drained to sump 12 and is used for a second washing of the filter cake; and from sump 11 wash liquor which has been drained into sump 11 from the second washing step and is used for first washing the filter cake on the filter wheel. A steam jacketed storage tank 14 for concentrated aqueous solution of urea is connected for passage of this solution into mixing vessel 10.

Operation of my process employing the apparatus of the accompanying drawing is as follows:

When, as indicated on the drawing, reactor 1 is being charged with reaction mixture, reactor 2 contains a reaction mixture maintained under suitable reaction conditions to form the urea-formaldehyde product of the process. Reactor 3 is being drained of products of reaction (mother liquor and precipitated solid) and they are being passed to filter wheel 9 through pump 8.

In charging reactor 1, there is pumped thereto from mixing vessel 10 a solution made up by adding to the filtrate and the wash liquor from the first washing step on filter wheel 9, a 77% aqueous solution of urea from storage tank 14. To avoid crystallization of urea from this concentrated solution it is maintained in the storage tank at about 72° C. by means of steam introduced to the steam jacket of the storage tank. There is additionally introduced into reactor 1 a 37% aqueous solution of formaldehyde from storage tank 4 and nitric acid from storage tank 5 to adjust the initial acidity of the reaction mixture in reactor 1 to pH 1.4. The aqueous formaldehyde is introduced into the reactor after all the other materials have been added and have been brought to a temperature in the range 25° to 35° C. by introducing steam into the reactor jacket.

In thus preparing the reaction mixture, the following amounts of materials are employed:

24,166 pounds of combined filtrate and wash liquor from the first washing step;

2,139 pounds of 77% urea solution from tank 14;

46.3 pounds of 70% nitric acid solution from tank 5; and 1,590 pounds of 37% aqueous formaldehyde from tank 4.

The reactor charge composed of the foregoing materials, has substantially the following composition by weight:

| | Per cent |
|---|---|
| Urea | 13.98 |
| Formaldehyde | 2.59 |
| Total Reactants | 16.57 |
| | Per cent |
| Nitric acid (HNO$_3$) | 1.16 |
| Ammonium nitrate | 1.47 |

Commercial formalin solution generally contains some methanol present to stabilize the formaldehyde. It is preferred to supply to my process a formaldehyde solution free from methanol, as in the case of this example, but methanol-free solution is not necessary. When a commercial solution containing a small amount of methanol is employed the concentration of methanol in the recycled liquors will build up but methanol will be removed in the wet filter cake from the filter wheel to establish a balance between that introduced to the process in the formaldehyde solution and that removed in the wet filter cake. As much as 9% methanol in the reaction mixture presents no difficulty in carrying out the reaction. This is more than would ordinarily accumulate in the process using the usual commercial formalin solutions.

As stated above, it is preferred to add the formaldehyde solution to the reactor only after all the other ingredients have been introduced and heated to reaction temperature. However, the formaldehyde may be added gradually concurrently with the other ingredients and mixed therewith provided care is taken that no greater proportion of formaldehyde solution to the other materials is introduced at any time than corresponds to their proportions in the reaction mixture being prepared. Thus, the formaldehyde solution may be introduced into the reactor with the other materials, if kept in its proper proportion and mixed therewith as added.

After introduction of all the constituents into reactor 1 the stirring is continued and the temperature held in the range of 25° to 35° C. for a period of 30 minutes from the time the preparation of the reaction mixture has been completed and it is at a temperature in the foregoing range. By means of cooling water circulated through the jacket of the reactor the temperature of the reaction mixture is maintained as near 30° C. as practicable. I preferably avoid consistently maintaining the reaction mixture at a temperature at either end of the permissible range, since material made entirely at 25° C. tends to have a greater solubility in water and that made entirely at 35° C. tends to have a lower nitrogen activity than material made when the temperatures of the reaction mixture are close to 30° C. over the course of the reaction.

At the end of the 30 minute reaction period the mixture of precipitated solid and mother liquor in reactor 1 is pumped to filter wheel 9 for separation of the solid from the mother liquor and washing of the separated solid. This washing is in four steps employing in each of the first and second steps the wash liquors resulting from the succeeding second and third step, respectively. The third and fourth washing steps are with a liquor made up of water and ammonia introduced into sump 13. For the fourth step, this liquor is recirculated from the sump to the filter wheel through a pipe 15 and after passing through the filter cake of solid on the wheel is returned to sump 13 through pipe 16. The ammonia in this solution serves to neutralize free acid in the solid and the water to wash out soluble constituents. Since a considerable amount of water is held by the filter cake as it leaves the filter wheel, in order to effectively wash it in this final stage and insure that it contains no free acid, the washing solution is recirculated several times through the filter cake and contains about 10% more ammonia than that required for neutralizing its acid content. For washing the precipitate from the reaction mixture described above, there is preferably supplied to sump 13 about 3,625 pounds of water and 34.2 pounds of a 28.1% aqueous ammonia solution for every ton of dried product recovered (dried to about 4% moisture content). The total solution circulated through the filter cake is about eleven times the amount supplied to the sump.

Liquid in amount equivalent to that supplied to sump 13 is withdrawn therefrom through pipe 17 and used for washing the filter cake in the third washing step. The wash liquor after passing through the filter cake drains into sump 12 from which it is passed through pipe 19 and used for washing the filter cake in the second step. The wash liquor from this second step flows into sump 11 and is passed to the filter wheel through pipe 18 to be used for first washing the solid. The wash liquor from this first washing step and the mother liquor first removed from the solid on the filter wheel, flow through pipe 20 to mixing vessel 10. At the same time urea solution from tank 14 is mixed with this wash liquor and mother liquor to prevent precipitation of solid in the mixing vessel or in the pipes leading therefrom to the reaction vessels. For clarity in arranging the drawing the point at which the urea solution is mixed with the mother liquor from the filter wheel is apparently at a distance from the filter wheel. In actual arrangement of a plant this point would be placed as near the filter wheel as convenient to avoid passing the mother liquor through a long pipe before addition of the urea. This would minimize difficulties arising from deposition of solid in the mother liquor before the urea is added thereto.

The filter cake removed from filter wheel 9 contains about 5,500 pounds of water for every 1,880 pounds urea-formaldehyde reaction product. It contains in addition small amounts of ammonium nitrate and free ammonia. It is dried, preferably by countercurrent contact with air heated to 100° C., and the dried product is ground, preferably to pass a 48 mesh screen or finer. Since conventional procedures and apparatus for drying, grinding and screening the product are employed, these are not shown in detail on the drawing but merely indicated thereon. It should be noted, however, that in drying the product care should be taken not to use unduly high temperatures, which may cause a reduction in the activity of the insoluble nitrogen. Heating the material at temperatures up to 100° C. to dry it in a normally rapid manner does not materially reduce the activity of its insoluble nitrogen content, although heating for long periods at such elevated temperatures may be harmful. At lower temperatures of about 75° C. the heating of the washed, neutralized material to dry it may be prolonged for about 15 hours or more without substantial deterioration. The presence of moisture during the heating tends to promote deterioration in the activity of the nitrogen. Material which has been dried to a point at which it is no longer sensibly moist may be heated at the higher temperatures for a relatively longer time than a material which contains substantial amounts of moisture.

The product of this process contains about 40% total nitrogen and about 34% water-insoluble nitrogen as determined by the method given on page 29 of the A. O. A. C. Methods of Analyses, Sixth Edition 1945. The insoluble nitrogen has a high activity (about 90% active) as determined by the method described on page 30 of the A. O. A. C. Methods of Analyses, Sixth Edition 1945, employing neutral potassium permanganate solution.

In the process carried out as described in this example, all of the wash liquors drained from the product on the filter wheel together with the mother liquor are recycled in the process and incorporated in the reaction mixture with make-up urea, formaldehyde and nitric acid. It is essential to the process of my invention that the mother liquor be recycled. It contains a high concentration of dissolved urea and soluble reaction products of urea and formaldehyde. Furthermore, by incorporating this mother liquor in the reaction mixture, higher yields are obtained of a water-insoluble product having the desired activity than are obtained by reacting a mixture made up of freshly supplied urea and formaldehyde containing the same total amount of these reactants as in the reaction mixture employed in carrying out my invention in which the urea and formaldehyde are supplied to the reaction partly in the form in which they are present in the recycled mother liquor. Accordingly, my invention is directed to a process in which the mother liquor is recycled with or without all or a part of the wash liquors.

When the concentrations of the formaldehyde and urea solutions supplied to the process are high or the urea is supplied as a solid and the formaldehyde as a concentrated aqueous solution so that insufficient make-up water is introduced in these materials to maintain the desired, about 15% to 30%, concentration of reactants in the reaction mixture, additional water is best supplied by recycling part or all of the wash liquors. Since the concentration of urea and formaldehyde in these liquors is highest in the first wash liquor and progressively decreases in the succeeding wash liquors, when all of these liquors are not recycled it is best practice to recycle the first liquor and succeeding wash liquors in turn until the required quantity of make-up water is recycled; any wash liquor withdrawn from the process being that relatively low in urea-formaldehyde content obtained in the later washing steps.

I have described in detail one operating cycle as carried out starting with the preparation of the reaction mixture and formation of the solid reaction product in the one reaction vessel, recovery of the solid separate from mother liquor and reuse of the mother liquor and wash liquors from washing the product in the preparation of reaction mixture. The same procedure is carried out employing reaction vessels 2 and 3. The timing of the operations is such that while reactor 1 is being charged with reactants, a reaction mixture previously charged into reactor 2 is there being maintained under reaction conditions for the 30 minute period during which the solid product is formed and precipitated and reactor 3 is being drained of reaction products which are conveyed to filter wheel 9. During the next 30 minute period reactor 3 will be charged, reactor 2 will be drained to filter wheel 9 and the reaction mixture in reactor 1 will be held under the described conditions for the 30 minute reaction period. Thus, the three successive steps of charging, reaction and draining are carried out in each of the three reactors in turn.

In the foregoing example the operations carried out in the reaction vessels from which reaction product is passed to the filter wheel, the separation of mother liquor from solid urea-formaldehyde product on the filter wheel and return of the mother liquor via the mixing vessel to the reactors, represents a cyclic procedure in which mother liquor and urea and formaldehyde dissolved therein are recycled. From this cycle the formaldehyde and urea combined in the solid product is withdrawn on the filter wheel wet with mother liquor. This mother liquor is largely washed out of the solid and replaced by wash water before the filter cake is lifted from the filter wheel and passed to the drying, grinding and screening steps. The filter cake, however, still contains residual amounts of the materials dissolved in the mother liquor. Nitric acid, having been neutralized by the ammonia in the wash liquor, appears in the final product as ammonium nitrate. To maintain the desired acidity of the reaction mixture, nitric acid is added to the cyclic system and with return of the wash liquor from the filter wheel to that system, ammonium nitrate enters the system. An equilibrium becomes established between the ammonium nitrate introduced to the cyclic system in the wash liquors and the ammonium nitrate carried out in the filter cake removed from the filter wheel. The water carried out of the cyclic system in the wet filter cake over and above that which is supplied in the dilute aqueous formaldehyde solution used in making up the reaction mixture, is introduced to the cyclic system as make-up water in wash liquor from the filter wheel, in the urea solution introduced into the mixing vessel and in the nitric acid solution supplied to maintain the desired acidity of the reaction mixture.

In the above example nitric acid is used with ammonium nitrate resulting from its neutralization with ammonia, to maintain the desired initial acidity of the reaction mixture. Any of the other known methods for adjusting acidity of reaction mixtures of urea and formaldehyde may be employed, including the use of buffer salts to control changes in acidity of the reaction mixture.

In the above example my recycle process is carried out employing batch preparation and treatment of the reaction mixture. This may, however, be done in a single reaction vessel with continuous addition of reactants thereto and removal of precipitated solid and accompanying mother liquor to a filter wheel or centrifuges for recovery and washing the solid product and return of mother liquor and wash liquor to the reaction vessel. In such continuous operation reaction mixture for one cycle is made up by continuously mixing the formaldehyde solution, urea, nitric acid, wash liquor and make-up water with mother liquor from a previous cycle in the proportions given in the above example, preferably by incorporating these materials in a pool of reaction mixture being treated in the reaction vessel. In a continuous process the reaction period is the average time of retention in the reaction vessel of the materials supplied thereto.

I have described in the foregoing example one embodiment of my invention and indicated some of the permissible modifications which may be made in that procedure. The following example of a process for carrying out my invention departs from the procedure of the first example in several important respects.

*Example 2.*—With reference to Fig. 2 of the drawings, numerals 21 and 22 indicate two reaction vessels in one of which, in its turn, urea and formaldehyde are reacted to precipitate an insoluble product under the conditions defined above, while the reacted mixture of solid and mother liquor in the other of these vessels is passed to a continuously operating centrifuge 23. The mother liquor is separated from the precipitated solid in the centrifuge and is passed into a tank 24 in which it is mixed with make-up urea introduced into this tank as a concentrated solution of the urea and water. A wash solution containing water in which ammonia has been dissolved is made up in a tank 25. After the mother liquor has largely been removed from the solid in centrifuge 23, it is first washed with the ammonical wash solution in tank 25 to remove residual mother liquor in the solid and the resulting wash liquor is drained into tank 24. The solid in the centrifuge is then further washed with wash solution from tank 25 with the wash liquor being drained off into tank 24 until sufficient make-up water has been introduced into this tank 24 and employed for making up the reaction mixture treated in vessel 21 or 22 to provide the required concentration of reactants in the reaction mixture. This is in addition to the water introduced in the urea solution supplied to tank 24 and in the formaldehyde and nitric acid solution supplied from storage tanks 26 and 27, respectively. After thus introducing the required amount of make-up water for recycling in the reaction mixture, subsequent wash liquors drained from centrifuge 23 are returned to tank 25 and incorporated in the ammoniacal wash solution used subsequently for washing solid in centrifuge 23. The thus washed solid is emptied from the centrifuge and is dried, ground to desired particle size, and size separated either by screening or other method.

The mother liquor drained from centrifuge 23 into tank 24 is mixed in this tank with sufficient urea to prevent precipitation of solid as heretofore described. This tank is provided with a jacket through which a heating or cooling fluid may be passed to bring the solution of urea and mother liquor to a temperature in the range 25° to 35° C. The solution thus prepared is charged to one of reaction vessels 21 or 22 together with nitric acid from tank 27 sufficient to provide the required initial acidity of the reaction mixture. Formaldehyde solution is added from tank 26 to adjust the urea-formaldehyde ratio in the reaction mixture within the ranges above defined. The reaction mixture thus prepared is maintained by means of a heating medium or a cooling medium supplied, as required, to a jacket surrounding the reaction vessel or to a heat transfer coil within the vessel to maintain the required reaction temperature during precipitation of insoluble urea-formaldehyde reaction product.

Following the described procedure, urea and formaldehyde are reacted to precipitate their solid reaction product. This is separated from the mother liquor in centrifuge 23 and is washed with the ammoniacal wash solution until it is substantially free from mother liquor and soluble constituents. The mother liquor together with any portion of wash liquors required to supply make-up water to the reaction system is recycled in making up the reaction mixture.

The use of a centrifuge in the process of this example in place of the filter wheel employed in the process of Example 1, permits a more rapid separation of mother liquor from solid before the solid is washed with the ammoniacal wash solution and of the wash liquors from the solid. In order to prevent an undue build-up in methanol concentration in the reaction system, the formaldehyde solution employed in the process of this example is one free from methanol or one containing a low enough methanol content so that the methanol in the centrifuged product withdrawn from the reaction cycle is sufficient to prevent undue methanol accumulation in the cyclic system.

I claim:

1. A cyclic process for the production of a solid urea-formaldehyde product containing water-insoluble nitrogen of high activity wherein an acidic aqueous reaction mixture initially having a pH of 0.9 to 1.7, containing 2.5 to 4 mols urea for every 1 mol formaldehyde and containing a total concentration of 30% to about 15% by weight of said urea and formaldehyde is maintained at temperatures in the range 25° to 45° C. for a reaction period of about ½ hour to 1½ hours, whereby said solid reaction product of urea and formaldehyde is formed and precipitated from an aqueous mother liquor containing dissolved urea and formaldehyde, separating said precipitated solid from mother liquor, withdrawing the solid wet with mother liquor from the cycle and returning the mother liquor for further reaction of urea and formaldehyde therein to form said solid reaction product, repeatedly carrying out said cycle and preparing the reaction mixture for one cycle by mixing the mother liquor separated from solid reaction product in a previous cycle with make-up urea and formaldehyde sufficient to provide the aforesaid ratio of 2.5 to 4 mols urea for every 1 mol formaldehyde and with make-up water required to provide in the reaction mixture said initial concentration of 30% to about 15% total urea and formaldehyde.

2. The process of claim 1 wherein the aqueous reaction mixture contains a progressively greater ratio of urea to formaldehyde from 3 to 4, has a progressively greater pH from 0.9 to at least 1.3 and is heated for a progressively shorter maximum period of 1½ hours to ½ hour as higher reaction temperatures above 35° C. are employed up to a temperature of 45° C.

3. A cyclic process for the production of a solid urea-formaldehyde product containing water-insoluble nitrogen of high activity wherein an acidic aqueous reaction mixture initially having a pH of about 1.3 to 1.7, containing 2.5 to 3 mols urea for every 1 mol formaldehyde and containing a total concentration of about 15% to 20% by weight of said urea and formaldehyde is maintained at temperatures in the range 25° to 35° C. for a reaction period of about ½ hour to 1½ hours, whereby said solid reaction product of urea and formaldehyde is formed and precipitated from an aqueous mother liquor containing dissolved urea and formaldehyde, separating said precipitated solid from mother liquor, withdrawing the solid wet with mother liquor from the cycle and returning the mother liquor for further reaction of urea and formaldehyde therein to form said solid reaction product, repeatedly carrying out said cycle and preparing the reaction mixture for one cycle by mixing the mother liquor separated from solid reaction product in a previous cycle with a dilute aqueous solution of formaldehyde, with make-up urea sufficient to provide the aforesaid ratio of 2.5 to 3 mols urea for every 1 mol formaldehyde and with make-up water required in addition to the water in said solution of formaldehyde to provide in the reaction mixture said initial concentration of about 15% to 20% total urea and formaldehyde.

4. The cyclic process of claim 3 for the production of a solid urea-formaldehyde product containing water-insoluble nitrogen of high activity wherein the solid wet with mother liquor withdrawn from the cycle is washed with an aqueous wash solution and preparing the reaction mixture for one cycle by mixing the mother liquor separated from solid reaction product in a previous cycle with 35 to 65 weight percent aqueous solution of formaldehyde, with make-up urea and with wash liquor recovered from the step of washing the solid in amount which incorporates make-up water in the reaction mixture to provide therein the initial concentration of about 15% to 20% total urea and formaldehyde.

5. A cyclic process for the production of a solid urea-formaldehyde product containing water-insoluble nitrogen of high activity wherein an acidic aqueous reaction mixture initially having a pH of about 1.3 to 1.7, containing 2.5 to 3 mols urea for every 1 mol formaldehyde and containing a total concentration of about 15% to 20% by weight of said urea and formaldehyde is maintained at temperatures in the range 25° to 35° C. for a reaction period of about ½ hour, whereby said solid reaction product of urea and formaldehyde is formed and precipitated from an aqueous mother liquor containing dissolved urea and formaldehyde, separating said precipitated solid from mother liquor, withdrawing the solid wet with mother liquor from the cycle and returning the mother liquor for further reaction of urea and formaldehyde therein to form said solid reaction product, washing with water the withdrawn solid, repeatedly carrying out said cycle and preparing the reaction mixture for one cycle by mixing the mother liquor separated from solid reaction product in a previous cycle with 35 to 65 weight percent aqueous solution of formaldehyde substantially free from methanol, with make-up urea sufficient to provide the aforesaid ratio of 2.5 to 3 mols urea for every 1 mol formaldehyde, with wash liquor from the washing of said solid wet with mother liquor and with make-up water required in addition to that in said solution of formaldehyde and in said wash liquor which is incorporated in the reaction mixture, to provide in the reaction mixture said initial concentration of 15% to 20% total urea and formaldehyde.

6. The cyclic process of claim 5 for the production of a solid urea-formaldehyde product containing water-insoluble nitrogen of high activity wherein the solid wet with mother liquor withdrawn from the cycle is washed in a series of steps in which the solid is last washed with a wash solution containing water supplied thereto in amount less than that retained by the washed solid and in preceding washing steps said solid is washed with the wash liquor resulting from washing the solid in a succeeding washing step, and preparing the reaction mixture for one cycle by mixing the mother liquor separated from solid reaction product in a previous cycle with 35 to 65 weight percent aqueous solution of formaldehyde, with make-up urea and with wash liquor recovered from the first and any succeeding steps of washing the solid in amount which incorporates make-up water in the reaction mixture to provide therein the initial concentration of about 15% to 20% total urea and formaldehyde.

7. A cyclic process for the production of a solid urea-formaldehyde product containing water-insoluble nitrogen of high activity wherein an acidic aqueous reaction mixture initially having a pH of 0.9 to 1.7, containing 2.5 to 4 mols urea for every 1 mol formaldehyde and containing a total concentration of 30% to about 15% by weight of said urea and formaldehyde is maintained at temperatures in the range 25° to 45° C. for a reaction period of about ½ hour to 1½ hours, whereby said solid reaction product of urea and formaldehyde is formed and precipitated from an aqueous mother liquor containing dissolved urea and formaldehyde, separating said precipitated solid from mother liquor, withdrawing the solid wet with mother liquor from the cycle and returning the mother liquor for further reaction of urea and formaldehyde therein to form said solid reaction product, repeatedly carrying out said cycle and preparing the reaction mixture for one cycle by mixing the mother liquor separated from solid reaction product in a previous cycle with make-up urea and formaldehyde sufficient to provide the aforesaid ratio of 2.5 to 4 mols urea for every 1 mol formaldehyde and with make-up water required to provide in the reaction mixture said initial concentration of 30% to about 15% total urea and formaldehyde, and in carrying out the aforedescribed cyclic process adding said make-up urea to said mother liquor immediately following the separation of the mother liquor from the precipitated solid and later, after conveying the mixture of mother liquor and make-up urea to the point in the cycle at which the reaction of the urea and formaldehyde is carried out, mixing therewith said formaldehyde.

8. In a process wherein a solid urea-formaldehyde reaction product is precipitated from an aqueous solution of urea and formaldehyde and the precipitated solid is separated from mother liquor containing dissolved urea and formaldehyde, the improvement which comprises inhibiting further precipitation of solid from said mother liquor by incorporating therein, immediately after separation of the mother liquor from the solid, urea in amount sufficient to increase the ratio of urea to formaldehyde to at least 6 mols urea to 1 mol formaldehyde.

9. The process for the production of a urea-formaldehyde reaction product containing insoluble nitrogen available as plant food which comprises reacting urea and formaldehyde in an acidic aqueous solution in which the total concentration of these reactions is in the range 15% to 30% and an insoluble reaction product is precipitated from the solution under the following conditions: (1) initial acidity of the aqueous solution in the range pH 0.9 to about 1.7; (2) mol ratio of urea to formaldehyde in the range 2.5:1 to 4:1; (3) temperature of the aqueous solution in the range 25° to 45° C.; (4) reaction time about ½ to about 1½ hours; and (5) when the temperatures maintained are above 35° C. the pH of the solution is progressively greater from 0.9 to at least 1.3, the urea-formaldehyde mol ratio is progressively greater from 3:1 to 4:1 and the maximum reaction time is progressively shorter from 1½ to ½ hour as high reaction temperatures are employed up to a temperature of 45° C.

10. The process for the production of a urea-formaldehyde reaction product containing insoluble nitrogen available as plant food which comprises reacting urea and formaldehyde in an acidic aqueous solution in which the total concentration of these reactants is in the range 15% to 30% and an insoluble reaction product is precipitated from the solution under the following conditions: (1) initial acidity of the aqueous solution in the range pH 1.3 to 1.7; (2) mol ratio of urea to formaldehyde in the range 2.5:1 to 3:1; (3) temperature of the aqueous solution in the range 25° to 35° C.; and (4) reaction time about ½ to about 1½ hours.

MEARL A. KISE.

References Cited in the file of this patent

UNITED STATES PATENTS

| Number | Name | Date |
|---|---|---|
| 2,415,705 | Rohner | Feb. 11, 1947 |

FOREIGN PATENTS

| Number | Country | Date |
|---|---|---|
| 528,582 | Germany | July 9, 1931 |